(12) United States Patent
Campau

(10) Patent No.: US 6,227,229 B1
(45) Date of Patent: May 8, 2001

(54) HIGH GAIN FLUID CONTROL VALVE ASSEMBLY

(75) Inventor: Daniel N. Campau, Grand Rapids, MI (US)

(73) Assignee: Flow-Rite Controls, Ltd., Grand Rapids, IL (US)

( * ) Notice: Subject to any disclaimer, the term of this patent is extended or adjusted under 35 U.S.C. 154(b) by 0 days.

(21) Appl. No.: 09/500,276

(22) Filed: Feb. 8, 2000

(51) Int. Cl.$^7$ ...................................................... F16K 21/18
(52) U.S. Cl. ............................................. 137/260; 251/282
(58) Field of Search ................................. 137/260, 883; 251/281, 282

(56) References Cited

U.S. PATENT DOCUMENTS

| | | |
|---|---|---|
| 3,580,542 | 5/1971 | Wright . |
| 3,805,839 | 4/1974 | Baumann . |
| 3,892,384 | 7/1975 | Myers . |
| 3,970,109 | 7/1976 | Uerlichs et al. . |
| 3,990,477 | 11/1976 | Johnson . |
| 4,155,535 | 5/1979 | Seamone . |
| 4,239,177 | 12/1980 | Williams et al. . |
| 4,252,296 | 2/1981 | Berg . |
| 4,386,141 | 5/1983 | Weidner et al. . |
| 4,696,874 | 9/1987 | Tadiello . |
| 4,749,633 | 6/1988 | Elias . |
| 4,751,156 | 6/1988 | Olimpio . |
| 5,022,436 | 6/1991 | Portolese . |
| 5,090,442 * | 2/1992 | Campau ........................ 137/260 X |
| 5,309,937 | 5/1994 | Rover . |
| 5,902,694 | 5/1999 | Landau . |

OTHER PUBLICATIONS

Wojtecki, Rudy, *Air Logic Control for Automated Systems.* CRC Press, 1999 (Chapter 5 "MPL Concepts and Components" pp. 51–59).

* cited by examiner

*Primary Examiner*—Kevin Lee
(74) *Attorney, Agent, or Firm*—Niro, Scavone, Haller & Nino

(57) ABSTRACT

The valve assembly of the present invention includes a body portion having one or more inlets and two aligned outlets. The outlets are located on opposing faces of the body portion, one having a generally rigid valve seat defining a first valve outlet port and the other having a generally flexible valve seat defining a second valve outlet port. The valve assembly also employs a valve support assembly configured to move relative to the body portion generally along the axis of the aligned outlets. The support assembly has a flexible valve member at one end positioned inside the body portion and configured to engage the rigid valve seat to block flow through the first valve outlet port. The support assembly also has a generally rigid valve member positioned outside the body portion and configured to engage the flexible valve seat to block flow through the second valve outlet port. With this construction, when the valve support member is in an open position, both the flexible and rigid valve members are spaced from the rigid valve seat and flexible valve seat, respectively, allowing flow of fluid through the valve. However, when the valve support assembly is moved to the closed position, both the valve members are in contact with their respective valve seats and fluid flow is blocked.

12 Claims, 4 Drawing Sheets

HIGH GAIN FLUID CONTROL VALVE ASSEMBLY

BACKGROUND OF THE INVENTION

The present invention relates to a fluidic valve device and, more particularly, to a valve assembly which is actuated by a relatively low energy signal, but may nonetheless be employed effectively in systems encountering either flow rates or pressures which are variable.

A "high gain" control valve refers to a valve which is actuated by a low energy signal to control a relatively high flow or pressure. There are many potential applications for control valves responsive to low energy signals. For example, a small control valve is needed for on demand, spot cooling of electronic circuits. The signal might be a process temperature signal in the form of an amplified thermocouple, thermopile or thermister voltage, or a displacement from a thermo-mechanical (thermostatic) sensor, or from signals indicating heat producing circuit activity in the area to be cooled by the control valve. If the control valve is sufficiently small and lightweight it might even be located in the circuit board, very close to the area to be temperature controlled. It would open to deliver cooling fluid directly to an area in response to such a signal and then close in the absence of the signal.

A small, high gain control valve is also needed as a fluid amplifier in fluid control systems. In fluid logic circuits, for example, the ability of one control valve (air relay) to control many others is referred to as "fan out." For example, if the output from one control valve can be used to control eight others, then the fan out is eight. Generally, the higher the fan out, the easier and more economical it is to design complex fluid logic circuits, provided the higher fan out does not come at the price of increased sensitivity to disturbance signals, including vibration, signal noise, or instability due to signal transmission limitations.

Another application for such a control valve is in the field of liquid level control in small reservoirs, where space limitations require very small displacement floats to sense liquid level and operate the refill control valve. The problem is that small displacement results in a low force level available to operate the control valve. Available float valves use some means to amplify the displacement force to a usable level. An example of this application is in single point watering (SPW) systems for industrial lead-acid batteries. Lead-acid batteries use an electrolyte, which is a solution of sulfuric acid and water. Water is consumed as a normal part of the charge/discharge cycle. The water, which is lost to both evaporation and electrolysis, must be replaced on a regular basis to maintain battery performance. Single point watering systems have become widely used for this purpose. A typical SPW system includes a refill control valve in each battery cell, interconnected by a network of tubing. A coupling attached to the tubing allows a water supply to be connected to feed refill water simultaneously into each cell. Depending on the type of SPW system, the water may be provided at very low pressure, such as from a reservoir mounted a few feet overhead, and referred to as "gravity feed," or from a pressurized supply that may be as high as 40 psi. Some SPW systems are designed to operate only with gravity feed supplies and some operate only with pressurized supplies, such as those disclosed in U.S. Pat. Nos. 4,527,593 and 5,048,557.

There are also several SPW systems which can be supplied with either gravity feed or pressurized water supplies. These systems claim to have the advantage that water flow and pressure are generally not very critical to the performance of their systems. However, this is not the case. In general, the valves in these systems behave differently under different supply pressures. In fact, the shut-off level in these valves (the level of electrolyte in the cell at which the refill valve closes) may vary significantly depending on operating pressure. In some cases, operation at pressure above 25 psi can cause premature shut-off, in which the valve closes before sufficient water is added to the cell to cover the battery plates. Subsequent charge and discharge cycles with exposed (not submerged in electrolyte) battery plates can cause permanent damage to the cell. These variable feed pressure valves all employ floats to sense liquid level and provide sufficient force to close the valve. Some designs use levers, which introduce friction and mechanical complexity, and increase the size of the control valve assembly. Others use a combination of stems, arms and links to allow the float to move the valve member into the fluid flow path so that it is swept into a closed position by the drag of the flow. These control valves are designed to close with the flow, so that as supply pressure increases, the required displacement force provided by the float needed to move the valve into a closed position decreases. This accounts for the fact that the liquid level shut-off point drops as supply pressure increases, since less displacement force is needed for shut-off. This variation can lead to problems in service. If the liquid level shut-off point in a battery is set sufficiently high so that high pressure water supplies can be used, then the shut-off level may rise too high if a low pressure supply is later used to top off the battery. If the shut-off level is too high, acid bubbles out of the vent ports during charge. This can seriously damage battery and battery room equipment. Water supply pressure can vary widely depending on many factors, such as the condition of filters, building demand variations, or in some cases portable water supplies used for refilling have water pumps powered by batteries and can lose pressure due to low battery voltage. Also, industrial batteries come in many sizes and capacities. When a battery is on charge, gas bubbles can form which cause the electrolyte to expand. On large, high capacity batteries, there is often very little clearance above the battery plates and the vent opening, so electrolyte is expelled during charging if the level is too high at the start of charge. The optimum shut-off level may be the same for two batteries, but due to expansion of the electrolyte during the charge cycle, the larger battery may not tolerate an increase in shut-off level as occurs under reduced operating pressure. This expansion can exceed the available clearance. These problems are a direct result of the design of the control valve used in float operated valves.

Conventional float operated valves used in single point watering systems are designed to be actuated with relatively small displacement floats. In order for the valve to operate over a wide range of supply pressure (gravity feed to 40 psi pressure) the displacement force must be amplified. This is typically done with lever arms, gears, hinges, pivots and links. A common characteristic of all known SPW float valves designed for operation over a wide pressure range is that the displacement force vector does not act through the center of the valve. The displacement force vector acts at a distance from the valve through a hinged link. This leads to friction and the increased sensitivity of the valve to wear and contaminants, which can interfere with the normal operation of the valve, particularly in the hostile conditions inside a battery cell, where high temperature, mechanical vibration, corrosive acid and floating debris are the norm.

Therefore, a need exists for a control valve which can be operated with a low energy level signal, is not sensitive to operating pressure variations, has accurate shut-off level and is reliable in hostile working conditions. The valve design should be scalable to meet a wide range of physical size and flow capacity requirements. To be practical for most applications it must be very economical to manufacture in high volumes. It would have the actuation force vector generated by the displacement of the float pass through the center of the valve port(s) and therefore operate without levers, arms, links, hinges, pivots or sliding of close fitting parts. This would allow the most compact design envelope and minimize the deleterious effect of friction on the operation and reliability of the valve.

SUMMARY OF THE INVENTION

The present invention is directed to a new fluidic control valve assembly which is actuated with a low energy level signal while operating effectively over a wide range of pressure and flow conditions. The valve overcomes the problems associated with prior art devices and achieves significant advantages in terms of performance, reliability and cost.

BRIEF DESCRIPTION OF THE DRAWINGS

These and other features, objects, and advantages of the present invention will become apparent from the following description of the drawings wherein like reference numerals represent like elements in the several views, and in which.

DETAILED DESCRIPTION OF THE PREFERRED EMBODIMENTS

Figure 1:
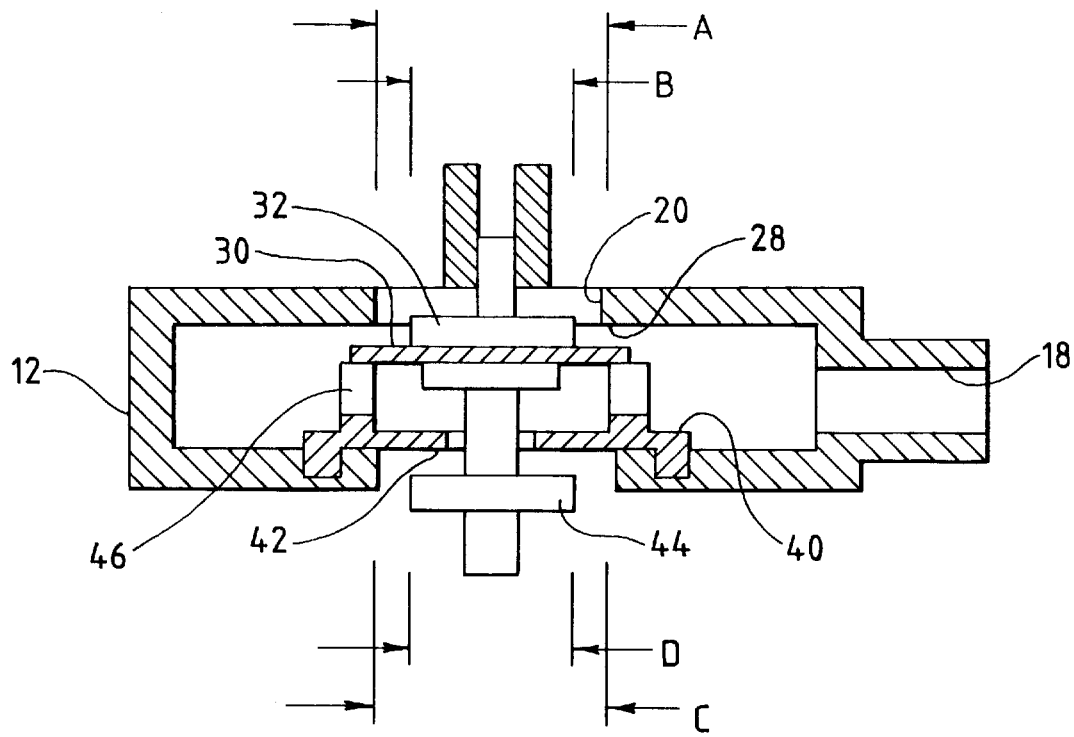
FIG. 1 is a cross-sectional view of a general embodiment of the valve assembly of the present invention in the open condition.
Figure 2:
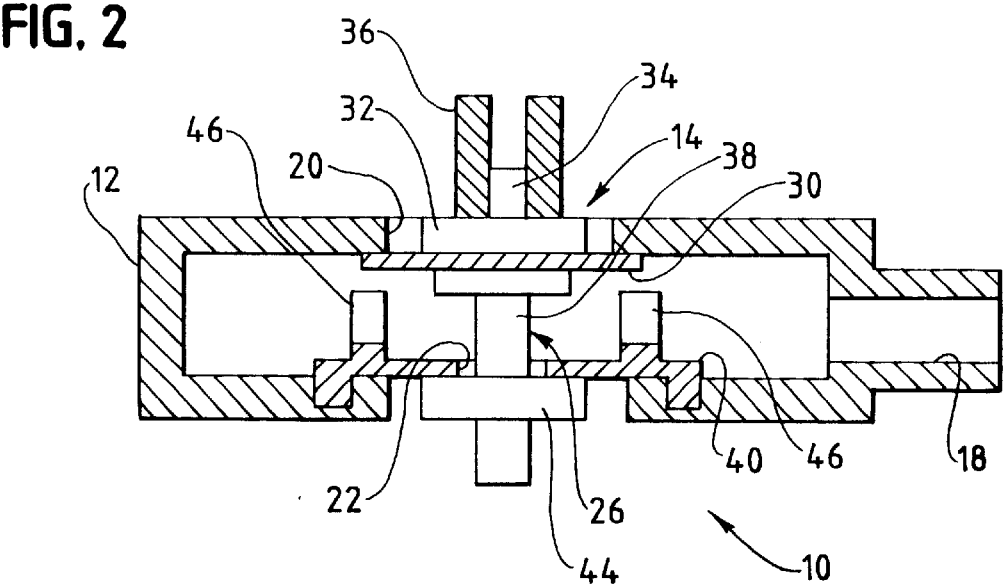
FIG. 2 is a cross-sectional view like that of FIG. 1, but showing the valve assembly in the closed condition.

With reference to FIG. 1, the valve assembly of the present invention is designated generally 10 and includes a body portion 12, having two opposing valves 14 and 16. Reference is made to the individual valves in the assembly as "upper" and "lower" as they are illustrated in the vertical, stacked configuration, which is the orientation suitable for use in a float or displacer actuated valve. However, the valve assembly may be oriented in any other position, where a displacement of the central valve support is generated by other inputs such as pressures, forces, electrical signals, etc. not dependent on gravity, as in liquid displacement.

The valve assembly includes a body 12 with at least one inlet 18 and two outlet ports 20 and 22. The outlets are aligned, preferably concentric, and located on opposing faces of the body. Valve action is controlled by a small movement of a centrally located valve support assembly 26. The upper port 20 is formed in the body and is effectively rigid. This port forms the upper valve seat 28. If desired, the upper valve seat could have some resiliency, such as provided by an o-ring. The valve support assembly includes a flexible upper valve member 30. The flexible upper valve member may be in the form of a diaphragm, held in position on the valve support assembly by a retainer 32. The flexible upper valve member is positioned inside the valve body, adjacent and concentric with the upper valve seat 28. The retainer 32 has a projection 34 extending through the upper valve port to provide a means for guiding the movement of the valve support assembly. Structure downstream of the upper valve port forms a guide 36 which works in a loose fitting relationship with the retainer projection to keep the diaphragm 30 and upper valve seat 28 in a generally concentric relationship.

The valve support assembly 26 includes a stem 38 which has the diaphragm and retainer mounted at one end. The other end of the stem projects through the lower valve port 22. The lower valve port is formed by a flexible member 40 mounted to the lower opening in the body, forming a flexible lower valve seat 42. The flexible lower valve member 40 is mounted in sealing relationship with the body 12. A central hole in the flexible lower valve member 40 forms the lower valve outlet port 22. The stem passes freely through it. Integrally formed on the stem 38 and having a larger diameter than the stem and the lower valve seat, is a rigid lower valve member 44 concentric with the stem and with the lower valve outlet port. This valve member 44 is located on the stem outside of the valve body 12. The sealing face of this valve member is located adjacent to the flexible lower valve seat. Both the upper and lower valve members are equally spaced from their respective seats, defining the stroke or travel of the valve support assembly between open and closed positions.

When the valve support assembly 26 is in its lower open position, the diaphragm 30 rests on stops 46, which are most conveniently formed in the flexible lower valve member 40. These stops 46 are local bosses of sufficient height so that fluid inside the body can freely flow between the bosses to communicate with both sides of the diaphragm 30 and with the lower valve outlet, valve and valve seat. In this way the fluid pressure acts on both sides of the diaphragm, maintaining nearly a balance of forces so the valve assembly 10 remains in a stable operating position over a wide range of operating pressures. Importantly, only a small force is required on the valve support assembly 26 to move it from its open position to its closed position.

For purposes of describing the operation of the valve, it is necessary to define the conditions downstream of the valve. For the applications described above, the valve can be considered to be at atmospheric pressure immediately downstream of both of the valve outlets. Therefore, if the upper valve 14 has a larger effective area than the lower valve 16, there will be a net upward force established as the valve begins to close. This is because as the valve closes a pressure differential develops across the diaphragm forcing it against the upper valve seat. Since the diaphragm is flexible, and the effective upper valve area is larger than the effective area of the lower valve, the valve support assembly moves into a closed position and flexes upward until a balancing force develops at the lower valve. This balancing force is developed by contact between the flexible lower seat 42 and the rigid lower valve member 44. This contact also forms a seal at the lower valve outlet port 22. Therefore, both upper and lower valves close in response to a small upward force applied to the valve support assembly. In many applications it is also desirable to have a small travel or stroke between open and closed positions. This is accomplished by having outlet areas large relative to inlet area. With just a small movement, the valve can move from a fully open condition where there is little pressure differential across the diaphragm, to a closing condition where a pressure differential starts to develop across the diaphragm. This has the advantage in liquid level applications in that a more accurate level shut-off point can be maintained with a small displacement float.

This valve design has the further advantage in that it can maintain nearly constant actuator closing force over a wide operating pressure range. This is due to the balanced valve design in which the force tending to lift the upper valve into a closed position is opposed by the force on the lower valve tending to hold the valve open. Just enough valve area differential is provided to give the valve a closing bias, without the risk of a premature shut-off occurring at high operating pressure and without the common characteristic that other float valves have in which there is a significant liquid level shut-off point differential between high and low operating pressures.

Figure 3:
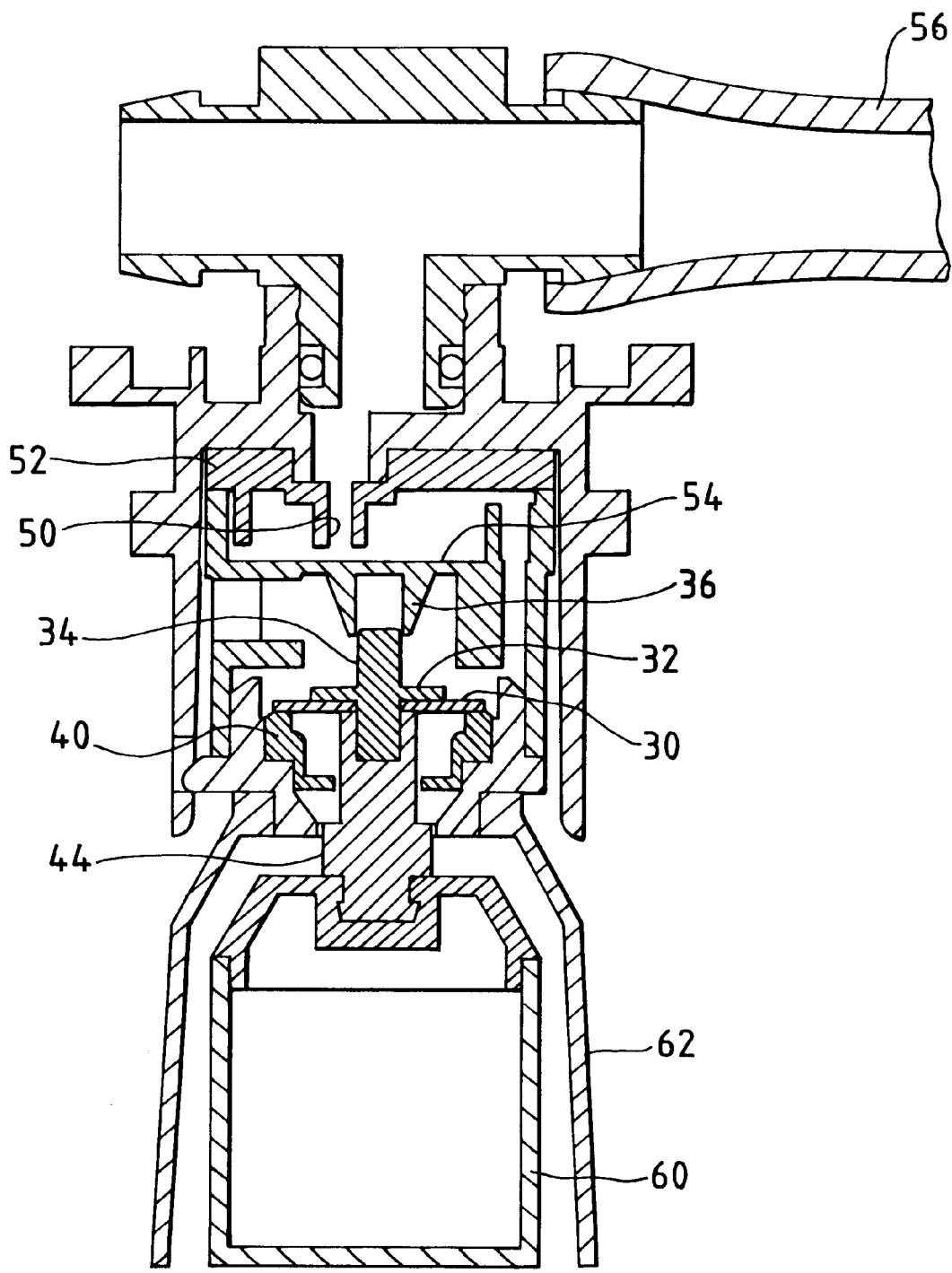
FIGS. 3 and 4 are cross-sectional views of one embodiment of the present invention useful in SPW systems for filling batteries.
Figure 4:
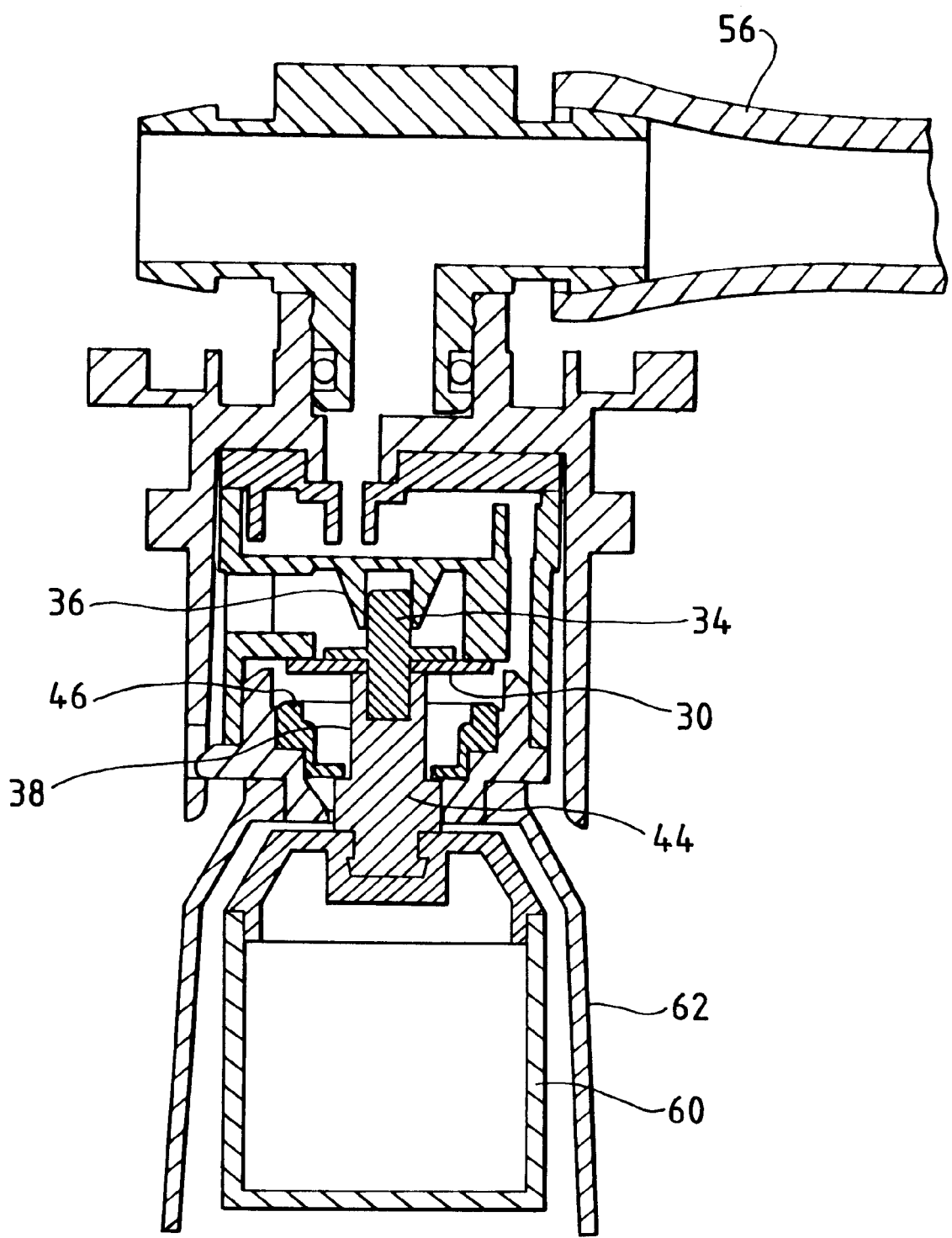

The operation of the valve assembly of the present invention is further explained with reference to one embodiment found to be particularly useful in a SPW system for filling battery cells. This embodiment is illustrated in FIGS. 3 and 4. FIG. 3 shows the valve in an open position as occurs when electrolyte level is below the displacer reset position and before water is supplied to the inlet connector. Reset of the valve from a closed to an open position occurs when the displacer assembly, including upper and lower valve members, has dropped down about 0.08 inches (2 mm) from its uppermost position. Having the upper valve rest on the flexible lower member 40 provides a stop. Some refill water from a previous cycle is trapped by having the end of the inlet port 50 in the top plate 52 extend below the upper rim of water trap reservoir 54. This water trap blocks the gas path between the water feed tubing 56 and the battery cell. The purpose of this water trap is to prevent the propagation of a flame from the cell into the tubing and then into neighboring cells. Battery cell gas is very flammable hydrogen gas, which evolves during normal battery charge and discharge cycling. Ignition can occur due to operator error such as smoking near the battery or using torches nearby. In these situations violent cell explosions can occur. To minimize the hazard it is important that the SPW system not allow a flame to enter the tubing, where it could cause a chain reaction involving additional cells. Tests have been conducted which verify the flame arresting ability of this design.

The displacer 60 is directly connected to the stem 38 of the valve support assembly. When electrolyte level is low, the displacer rests in its reset position, which opens both upper and lower valves. In this orientation, water is free to flow through both upper and lower valve ports. The forces on the valve support assembly are low so that the weight of the displacer is sufficient to hold the valve open over the full range of operating pressures, typically limited to 40 psi or below. The valve may be designed for higher pressure, but SPW systems limit maximum pressure to prevent overstressing the interconnecting tubing 56.

An important feature of this design is that a relatively small displacement float 60 can be used compared to other SPW float valves. This is because of the balanced valve design in which the force on the upper valve 14 acting to close the valve is reduced by the force on the lower valve 16 acting to keep the valve open. There is less net force required to hold the valve open, so the weight of the displacer can be less than in other float valves.

The smaller displacer allows the use of a skirt 62 to protect the displacer. Other float valves use floats too large in diameter to allow the addition of a skirt. The valve would not fit through a standard bayonet style vent port, of the type widely used on industrial batteries. The skirt 62 surrounds the displacer 60 helping to shield it from floating debris. Portions of the skirt 62 extend down to at least the lowest level attained by the displacer when in the reset position.

It is common in industrial batteries for a panel, called a moss shield, to be placed over the plates, typically about one-half inch or so below the electrolyte level. This panel is anchored but frequently bows upward or rides upward after a time. The skirt prevents the moss shield from pushing the displacer upward, which might close the valve and cause permanent cell damage.

As illustrated in FIG. 4, when the electrolyte level rises sufficiently to lift the displacer 60, the upper and lower valves, 30 and 44, are pressed against their respective seats, 28 and 42, by the pressure of the supply line, blocking further flow into the cell. In the SPW application, the valve is not designed to reopen once it has closed and supply pressure remains on. Reset to the ready position occurs only after supply pressure has been relieved. This pressure relief can be provided by a separate valve system on the water supply line, or the refill valves themselves can be designed to allow a small seepage that will slowly relieve line pressure after the water supply has been disconnected from the battery SPW system. In this way, the valves are reset into the ready state for the next watering cycle.

In other applications, it is desirable to have continuous supply pressure and allow the presence or absence of the signal force actuate the valve to an open or closed position. This is an important feature of this design because the critical valve dimensions A, B, C, and D can be set to allow small signal force and travel (force x travel=energy, therefore, low energy signal). In float valve designs, it is feasible to have a float of sufficient weight to open the valve while it is under continuous supply pressure, and of sufficient displacement to provide the buoyant force necessary to lift the float into a closed position. Thus, an automatic on as well as automatic off refill valve is feasible with this design. Typical applications for this type of valve include toilet tank refill, swimming pool and general industrial tank refill.

Figure 5A:
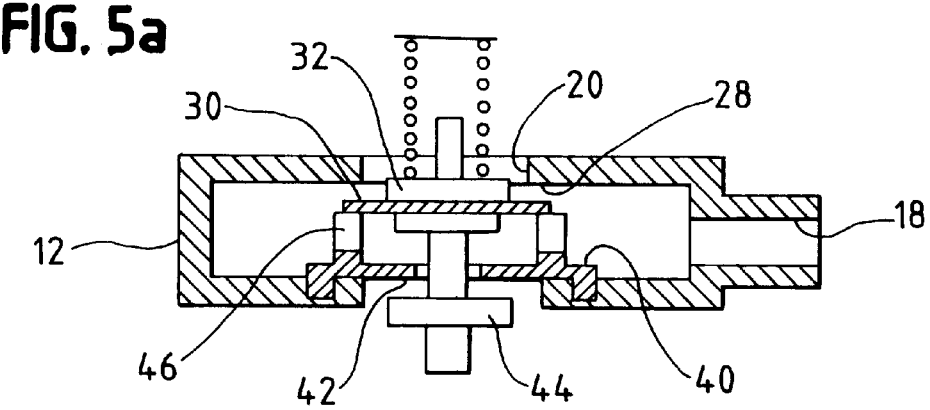
FIG. 5 is a series of illustrations showing a valve assembly like that of FIG. 1 in various alternative embodiments.
Figure 5B:
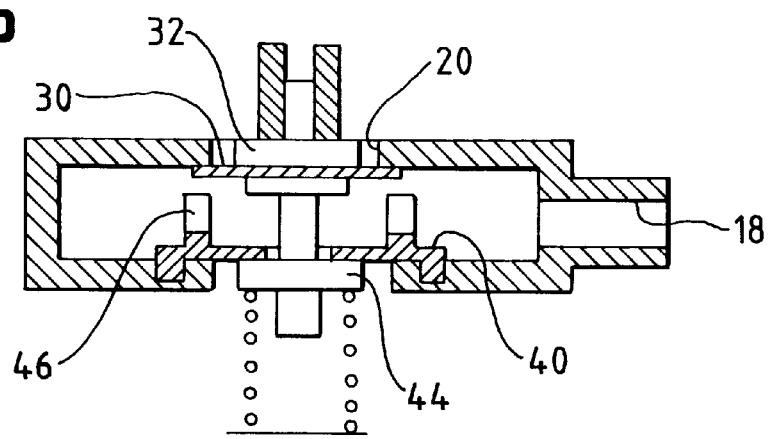
Figure 5C:
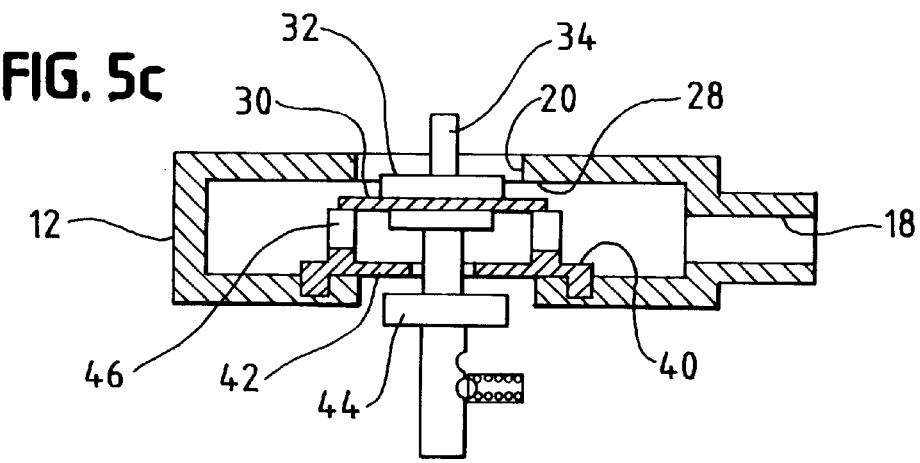

Other ways of actuating the valve besides the buoyant displacement force are contemplated, in which the signal energy is provided by pressure, temperature, electrical or mechanical means. The valve can easily be biased in a normally open or normally closed position, or in a bi-stable position in which separate open and close signals determine the valve position. FIG. 5 illustrates some of the possible configurations, although the examples are not intended to show all the variations or signal possibilities.

It will be appreciated by those skilled in the art that various changes and modifications can be made to the illustrated embodiments without departing from the spirit of the present invention. All such modifications and changes are intended to be covered by the appended claims.

I claim:

1. Apparatus for controlling flow of a fluid including:
   a body portion having one or more inlets and first and second opposing outlets, the first outlet having a relatively rigid valve seat defining a first valve outlet port, and the second outlet having a flexible valve seat defining a second valve outlet port;
   a valve support assembly including a stem and configured for movement relative to the first and second outlets, said valve support assembly including a flexible valve member mounted to said stem portion, said flexible valve member having sufficient size to block flow through the first valve outlet port when in contact with the rigid valve seat;
   said stem positioned relative to the body portion so that the flexible valve member is positioned inside the body portion upstream of the first valve outlet port;

an enlarged portion of said stem being located downstream of the second valve outlet port and being larger than the second valve outlet port to block flow when in contact with said flexible valve seat;

such that when the valve support assembly is in a first open position, both the flexible valve member and the enlarged portion are spaced from the first valve outlet port and the second valve outlet port, respectively, allowing fluid introduced into the body to exit the body through the first and second outlet ports; and when the valve support assembly is in a second closed position, both the flexible valve member and the enlarged portion are in sealing contact with the flexible valve seat and the rigid seat, respectively, shutting off the flow of fluid through the valve body.

2. The apparatus of claim 1 in which the movement of the valve support assembly is controlled by a float responsive to the presence and/or absence of liquid.

3. The apparatus of claim 1 in which the movement of the valve support assembly is controlled by pressure, temperature, or electrical or mechanical energy.

4. The apparatus of claim 1 in which the effective areas of the first and second valve outlet ports are approximately equal.

5. The apparatus of claim 1 in which the effective area of the first valve outlet port is larger than the second valve outlet port.

6. The apparatus of claim 1 in which the effective area of the first valve outlet port is smaller than that of the second valve outlet port.

7. The apparatus of claim 1 in which a spring is used to bias the valve support assembly in either a normally open or normally closed position, so that when a control signal is applied sufficient to overcome the bias force, the valve support assembly will shift to the opposite position and, in the absence of said control signal, the valve support assembly will return to its normal position.

8. The apparatus of claim 1 in which a dual detent is used to maintain the valve support assembly in either of two stable positions, in which a close control signal will move the valve support assembly from the open to the closed position and an open control signal will move the valve support assembly from the closed position to the open position, and in the absence of a signal the valve support assembly will remain in a stable position corresponding to the last signal input.

9. The apparatus of claim 1 configured for use in a single point watering system for filling batteries with water including:

a liquid displacement device to provide a valve closing signal;

a cap portion adapted to seal the apparatus to a battery cell cover; and a gas vent port to vent cell gas to the atmosphere, independent of the water flow path through the body portion.

10. The apparatus of claim 9 including a reservoir to hold water to thereby block the propagation of a flame through the valve.

11. The apparatus of claim 9 including an inlet connector with three inlet ports connected in a sealed, swivel joint relationship with a cap portion.

12. The apparatus of claim 9 including a skirt which at least partially surrounds said liquid displacement device.

* * * * *